United States Patent [19]

May

[11] Patent Number: 4,692,861
[45] Date of Patent: Sep. 8, 1987

[54] MICROCOMPUTER WITH INTERPROCESS COMMUNICATION

[75] Inventor: Michael D. May, Bristol, United Kingdom

[73] Assignee: Inmos Limited, Bristol, England

[21] Appl. No.: 679,041

[22] PCT Filed: Apr. 11, 1984

[86] PCT No.: PCT/GB84/00124

§ 371 Date: Dec. 4, 1984

§ 102(e) Date: Dec. 4, 1984

[87] PCT Pub. No.: WO84/04188

PCT Pub. Date: Oct. 25, 1984

[30] Foreign Application Priority Data

Apr. 11, 1983 [GB] United Kingdom ............... 8309770

[51] Int. Cl.[4] .................................. G06F 9/06
[52] U.S. Cl. ..................................... 364/200
[58] Field of Search ... 364/200 MS File, 900 MS File

[56] References Cited

U.S. PATENT DOCUMENTS

| | | | |
|---|---|---|---|
| 4,056,846 | 11/1977 | Callahan et al. | 364/200 |
| 4,084,228 | 4/1978 | Dufond et al. | 364/200 |
| 4,155,117 | 5/1979 | Mitchell, Jr. | 364/200 |
| 4,384,324 | 5/1983 | Kim | 364/200 |
| 4,433,376 | 2/1984 | Lombardo et al. | 364/200 |
| 4,449,182 | 5/1984 | Rubinson | 364/200 |
| 4,466,058 | 8/1984 | Girard | 364/200 |

OTHER PUBLICATIONS

IBM Technical Disclosure Bulletin "Data Processor Real-Time Input/Output Channel", R. W. Callahan, H. J. Crook and T. R. Edel, vol. 19, No. 8, Jan. 1977, pp. 3005-3011.

*Primary Examiner*—Archie E. Williams, Jr.
*Assistant Examiner*—Emily Y. Chan
*Attorney, Agent, or Firm*—Edward D. Manzo

[57] ABSTRACT

A microcomputer system with a processor and memory operates concurrent processes with synchronized communication between pairs of processes. Each communicating process has program instructions including one communication instruction to output or input data. The processes executed by a processor are scheduled by identifying a collection awaiting execution and descheduled by interrupting execution of instructions by the process. A communication channel is used to hold a value indicating whether or not either of a pair of communicating processes has yet executed an instruction requiring communication through that channel. Each communicating process tests the channel contents, and if the other communicating process has not yet reached the corresponding communication instruction, the process is descheduled until both processes have reached corresponding program stages.

36 Claims, 5 Drawing Figures

4,692,861

MICROCOMPUTER WITH INTERPROCESS COMMUNICATION

The invention relates to microcomputers with interprocess communication and is an improvement relating to the microcomputer described in our copending European Patent Application 83307078.2, Japanese Patent Application No. 221455/1983 and U.S. patent application Ser. Nos. 552,601, now U.S. Pat. No. 4,680,698, 552,602, now abandoned, 553,027, now abandoned, 553,028 and 553,029.

BACKGROUND TO THE INVENTION

The above mentioned applications describe an improved microcomputer comprising a single integrated circuit device having a processor and memory in the form of RAM on the same integrated circuit device, the processor being arranged to operate in accordance with functions selected from a function set. Said function set includes direct functions and indirect functions, the indirect functions being used to select one of a variety of "operations". Said operations include the operation "synchronise" which is used to permit two processes to communicate with each other, the two processes being either on the same microcomputer or in other cases the two processes may be on separate respective microcomputers. As can be seen from the above mentioned patent applications, use of the operation "synchronise" has required two word locations in memory to provide a channel permitting process to process communication on the same microcomputer. One word of the channel was used to indicate the state of the channel and the other word was used to hold data for communication through the channel. Furthermore, process to process communication requires that each process includes in its program sequence two operations of "synchronise" for each message transmission in order to ensure that the message transmission occurs when the two processes are at corresponding stages in their program sequences. In some circumstances this may cause a process to be descheduled twice in order to effect synchronised message transmission.

OBJECTS OF THE INVENTION

It is an object of the present invention to provide an improved microcomputer wherein data transmission between processes may be effected by use of instructions which may result in improved performance due to the use of fewer instructions during process to process communication. It is an further object to implement a communication channel using less memory space.

In a preferred embodiment, the "synchronise" operation referred to in the above mentioned patent applications can be replaced by "input" and "output" operations as described below.

SUMMARY OF THE PRESENT INVENTION

The present invention provides a microcomputer comprising memory and a processor arranged to execute a plurality of concurrent processes, each in accordance with a program consisting of a plurality of instructions for sequential execution by the processor, each instruction designating a required function to be executed by the processor, said processor comprising (1) a plurality of registers and data transfer means for use in data transfers to and from said registers (2) means for receiving each instruction and loading into one of the processor registers a value associated with the instruction, and (3) control means for controlling said data transfer means and registers in response to each instruction received to cause the processor to operate in accordance with the instruction, wherein the microcomputer includes:

(a) scheduling means to enable the processor to share its processing time between a plurality of concurrent processes, said scheduling means comprising:
  (i) means for identifying one or more processes which form a collection awaiting execution by the processor
  (ii) means for descheduling a process by interrupting execution of the current process
  (iii) means for scheduling a process by adding it to said collection, and
(b) communication means to permit data transmission from one process to another when both processes are at corresponding stages in their program sequences, an outputting process operating to output data in response to an output instruction in its program and an inputting process operating to input data in response to an input instruction in its program, said communication means including:
  (i) a channel comprising store means for holding a value indicating whether a process has executed an instruction to effect data transmission using that channel,
  (ii) means, responsive to execution of an input or output instruction by one of the processes involved in the data transmission when said one process is the current process for testing the contents of said channel and arranged to operate said means to deschedule the current process if the channel does not contain a value indicating that the other process involved in the data transmission has reached a corresponding program stage, the communication means being arranged such that an outputting process requires only one output instruction in its program sequence and an inputting process requires only one input instruction in its program sequence, whereby either process is not descheduled more than once, in order to effect such data transmission.

It will be understood that the term microcomputer relates to small sized computers generally based on integrated circuit devices but it does not impose any limit on how small the computer may be.

Preferably the scheduling means includes means for indicating the current process which is being executed by the processor and the communication means includes means for loading into said channel an identification of the current process if that current process is descheduled as a result of said testing of the contents of the channel.

Preferably said identification is a pointer value identifying an address of a memory workspace of the current process.

Preferably said channel is one of a plurality of channels, each comprising an addressable store location. Preferably the microcomputer is arranged to permit data transmission between processes which are executed on the same microcomputer and for this purpose the or each channel comprises a memory location. Preferably the microcomputer is arranged to permit external data transmission between processes which are executed on different microcomputers and in this case the or each channel may comprise a first register forming part of an external communication link.

In a preferred embodiment, the microcomputer comprises an integrated circuit device including a plurality of channels some in the form of registers and some provided by memory locations in memory on the same integrated circuit device as the processor. Preferably the channel provided by memory locations each comprise a single word location.

BRIEF DESCRIPTION OF THE DRAWINGS

An embodiment of the invention will now be described by way of example and with reference to the accompanying drawings in which.

DESCRIPTION OF THE PREFERRED EMBODIMENT

Figure 1:
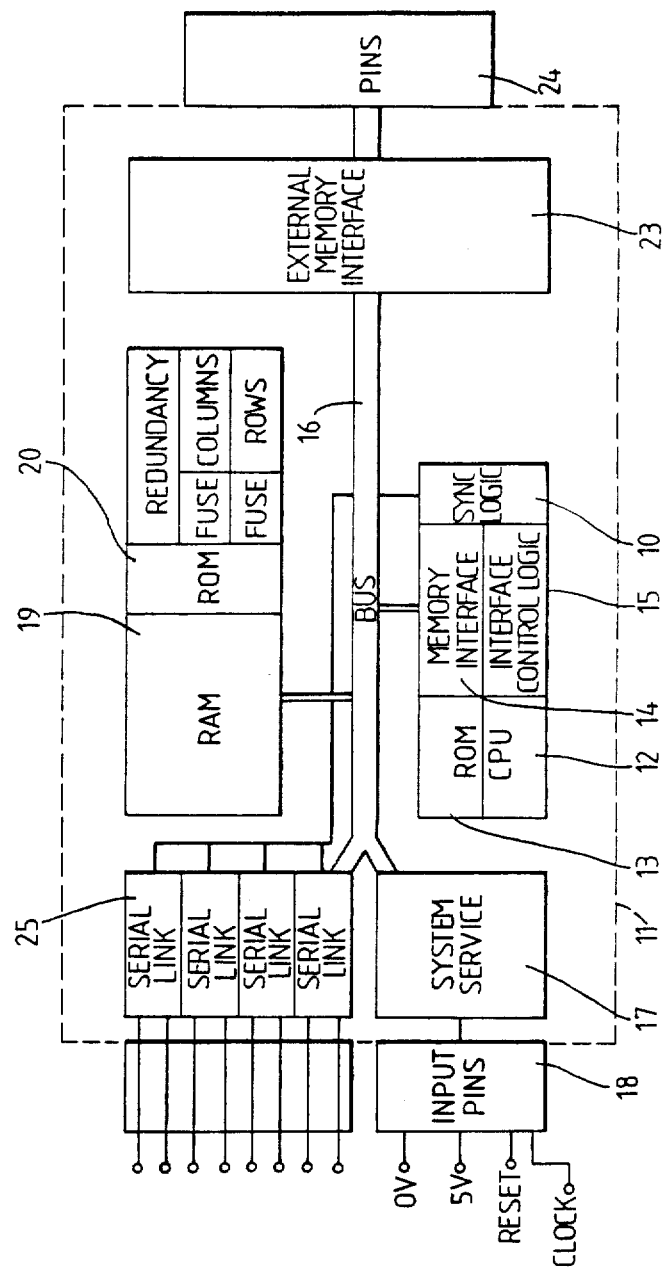
FIG. 1 is a block diagram showing the main features of the microcomputer.
Figure 2:
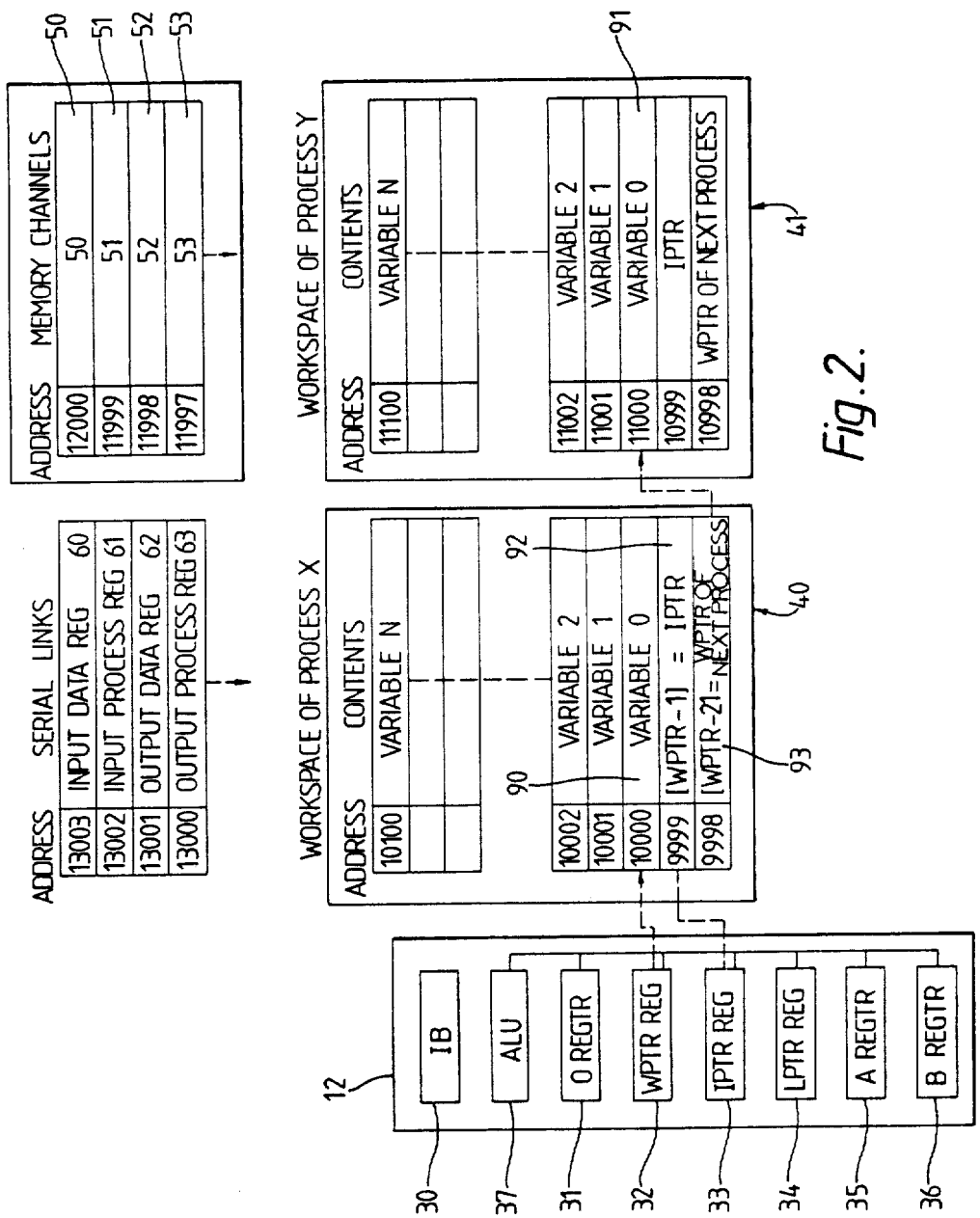
FIG. 2 shows an arrangement of memory workspaces, registers, memory channels and serial links in the microcomputer.

The microcomputer described in this example comprises an integrated circuit device in the form of a single silicon chip having both a processor and memory in the form of RAM as well as links to permit external communication. The main elements of the microcomputer are illustrated in FIG. 1 on a single silicon chip 11 using p-well complementary MOS technology. A central processing unit (CPU) 12 is provided with some read-only memory (ROM) 13 and is coupled to a memory interface 14 controlled by interface control logic 15. The CPU 12 incorporates an arithmetic logic unit (ALU), registers and data paths some of which are illustrated in FIG. 2. The CPU 12 and memory interface 14 are connected to a bus 15 which provides interconnection between the elements on the chip 11. A service system 17 is provided with a plurality of input pins 18. The microcomputer is provided with a random access memory (RAM) 19 and ROM 20 and the amount of memory on the chip is not less than 1K byte so that the processor 12 can be operated without external memory. Preferably the memory on the chip is at least 4K bytes. An external memory interface 23 is provided and connected to a plurality of pins 24 for connection to an optional external memory. To allow the microcomputer to be linked to other microcomputers to form a network, a plurality of serial links 25 are provided having input and output pins. The input and output pins of one serial link may each be connected by a single wire, non-shared unidirectional connection, to the corresponding output and input pins of a serial link on another microcomputer. Each serial link is connected to a synchronisation logic unit 10 comprising process scheduling logic.

The block diagram shown in FIG. 1 corresponds to that included in the above mentioned European Patent Application No. 83307078.2, Japanese Patent Application No. 221455/1983 and U.S. patent application Ser. Nos. 552,601, 552,602, 553,027, 553,028 and 553,029. To avoid unnecessary repetition of description, the full details of the construction and operation of that microcomputer will not be set out below but the description in the above mentioned patent applications is hereby incorporated herein by reference.

As described in the above mentioned patent applications, the CPU 12 includes a plurality of registers the following of which are shown in FIG. 2:

| Abbreviation | Register |
|---|---|
| IB | Instruction buffer 30 for receiving sequentially from memory instructions from a current process program |
| OREGTR | An operand register 31 for receiving data derived from an instruction in the instruction buffer 30 |
| WPTR REG | A register 32 for holding a workspace pointer (WPTR) of the current process |
| IPTR REG | A register 33 which holds an instruction pointer (IPTR) indicating the program stage of the current process |
| LPTR REG | A register 34 for holding a pointer to the workspace of the last process on the list of processes waiting to be executed |
| AREGTR | A first (A) register 35 for holding an operand for the ALU |
| BREGTR | A second (B) register 36 arranged as a stack with the AREGTR for holding operands for the ALU |

The CPU also includes the arithmetic logic unit 37 and the contents of the CPU are interconnected to permit data transfer to and from said registers under the control of a microprogram held in a microinstruction ROM 13 (see FIG. 4), which is arranged to respond to "input" and "outpt" operations defined below.

Figure 4:
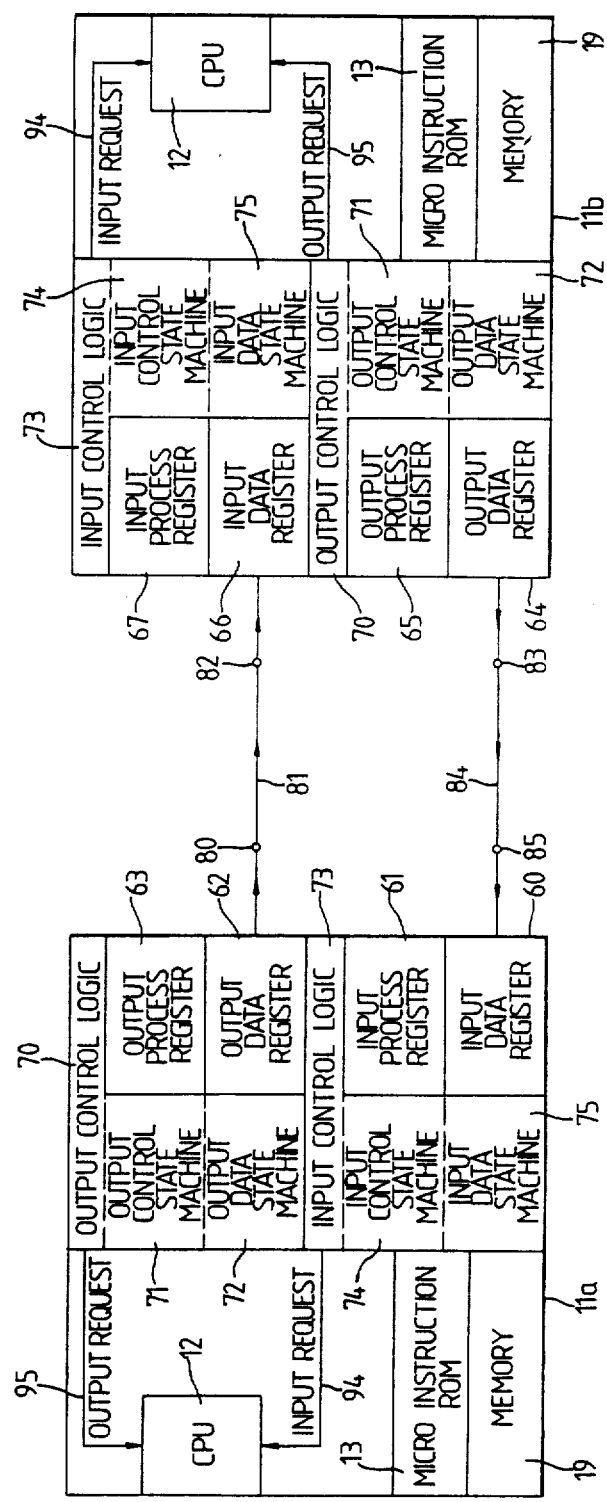
FIG. 4 illustrates a network of two interconnected microcomputers permitting process to process communication from one microcomputer to the other.

FIG. 2 also illustrates a workspace region 40 provided in the memory 19 for a process X as well as a workspace region 41 for a process Y. Each workspace comprises a plurality of addressable locations as indicated arranged to hold a plurality of variables associated with the process as well as the value IPTR to indicate the program stage for that process when it is next rescheduled together with a pointer to the WPTR of the next process in a collection of processes awaiting execution by the processor. FIG. 2 also indicates four memory channels 50, 51, 52 and 53 each comprising a single word addressable location in the memory 19. It will be understood that the number of channels is not limited to four and any number of channels may be provided as required. FIG. 2 also illustrates the provision of serial link registers which are each addressable in the same way as the memory channels or other memory locations. Each serial link 25 includes an input data register 60, an input process register 61, an output data register 62 and an output process register 63. FIG. 4 illustrates a network comprising two interconnected microcomputers 11a and 11b and for simplicity only one serial link is shown in block form on each of these microcomputers. The output process registers of each link form an output channel having associated with it an output data register as well as output control logic 70 which includes an output control state machine 71 and an output data state machine 72. The input process register forms an input channel having associated with it an input data register as well as input control logic 73 including an input control state machine 74 and an input data state machine 75. The control logic 70 and 73 as well as the control and data state machines are constructed and operated as described in the above mentioned patent applications with the exception of the succession of states of the control state machines and this will be described below.

As can be seen from FIG. 4, the output data register 62 is connected to an output pin 80 which is connected by a single non-shared unidirectional wire 81 to an input pin 82 connected to the input data register 66. Similarly the output data register 64 is connected via an output pin 83 through a single non-shared unidirectional wire 84 to an input pin 85 connected to the input data register 60.

The program sequence for each process includes a succession of instructions incorporating functions and operations as described in the above mentioned patent applications.

In order to effect message transmission between processes either on the same microcomputer or between processes on different microcomputers, the above mentioned patent applications use the operation called "synchronise" which has code number 11 in the list of operations.

The present example provides an improved microcomputer which has improved performance due to the use of fewer operations during process to process communication and furthermore less memory space is required to implement a communication channel as each of the above mentioned channels 50 to 53 involves a single word location only rather than the two word locations for the channels 40 to 43 of the above mentioned patent applications. These changes are effected in the present example by arranging for the microcomputer to respond to additional operations entitled "input" and "output" which may be added to the list of operations given in the above mentioned patent applications and these additional operations may have code numbers 16 and 17. Using the OCCAM language notation which is set forth in the booklet entitled *Programming Manual—OCCAM* published and distributed by Inmos Limited in 1983 in the United Kingdom as well as "Process-Orientated Language Meets Demands of Distributed Processing", Electronics (Nov. 31, 1982) both of which are hereby incorporated herein by reference, the operations "output" and "input" as well as the procedures "wait( )" and "run (OREG)" are defined as follows:

| output | |
|---|---|
| Definition: | |
| 1 | SEQ |
| 2 | OREG := memory [ AREG ] |
| 3 | IF |
| 4 | OREG = READY |
| 5 | SEQ |
| 6 | memory [ AREG + 1 ] := BREG |
| 7 | memory [ AREG ] := WPTR |
| 8 | wait ( ) |
| 9 | OREG = NIL |
| 10 | SEQ |
| 11 | memory [ WPTR ] := BREG |
| 12 | memory [ AREG ] := WPTR |
| 13 | wait ( ) |
| 14 | TRUE |
| 15 | SEQ |
| 16 | memory [ OREG ] := BREG |
| 17 | memory [ AREG ] := NIL |
| 18 | run ( OREG ) |

| input | |
|---|---|
| Definition: | |
| 1 | SEQ |
| 2 | OREG := memory [ AREG ] |
| 3 | IF |
| 4 | OREG = READY |
| 5 | SEQ |
| 6 | memory [ WPTR ] := memory [ AREG + 1 ] |
| 7 | memory [ AREG ] := NIL |
| 8 | OREG = NIL |
| 9 | SEQ |
| 10 | memory [ AREG ] := WPTR |
| 11 | wait ( ) |
| 12 | TRUE |
| 13 | SEQ |
| 14 | memory [ WPTR ] := memory [OREG] |
| 15 | memory [ AREG ] := NIL |
| 16 | run ( OREG ) |

The procedure "wait( )" is defined as follows:

| PROC wait ( ) | |
|---|---|
| 1 | SEQ |
| 2 | memory [ WPTR − 1 ] := IPTR |
| 3 | for each external input request from a link |
| 4 | SEQ |
| 5 | OREG := link [ process ] |
| 6 | link [ process ] := NIL |
| 7 | memory [ OREG ] := link [ data ] |
| 8 | run ( OREG ) |
| 9 | for each external output request from a link |
| 10 | SEQ |
| 11 | OREG := link [ process ] |
| 12 | link [ process ] := READY |
| 13 | run ( OREG ) |
| 14 | WPTR := memory [ WPTR − 2 ] |
| 15 | IPTR := memory [ WPTR − 1 ] |

The procedure "run (OREG)" is defined as follows:

| PROC run ( OREG ) | |
|---|---|
| 1 | IF |
| 2 | OREG <> READY |
| 3 | SEQ |
| 4 | memory [ LPTR − 2 ] := OREG |
| 6 | LPTR := OREG |
| 6 | OREG = READY |
| 7 | SKIP |

As mentioned above, the succession of states of the output control state machine 71 and the input control state machine 74 need modification from those described in the above mentioned patent applications in accordance with the following tables of successive states:

| OUTPUT CONTROL STATE MACHINE 71 | | | |
|---|---|---|---|
| State | Inputs | Outputs | Next State |
| any | Reset | SetPregready | waitdata |
| waitdata | Pregready | | waitdata |
| waitdata | Pregwptr | | send1 |
| send1 | ΔDatagone | Datago | send1 |
| send1 | Datagone | | send2 |
| send2 | Datagone | | send2 |
| send2 | ΔDatagone | | waitack1 |
| waitack1 | ΔAckready | | waitack1 |
| waitack1 | Ackready | | waitack2 |
| waitack2 | Ackready | Acktaken | waitack2 |
| waitack2 | ΔAckready | Setrequest | waitsched |
| waitsched | Pregwptr | | waitsched |

-continued

OUTPUT CONTROL STATE MACHINE 71

| State | Inputs | Outputs | Next State |
|---|---|---|---|
| waitsched | Pregready | | waitdata |

INPUT CONTROL STATE MACHINE 74

| State | Inputs | Outputs | Next State |
|---|---|---|---|
| any | Reset | SetPregnil | receive1 |
| receive1 | ΔDataready | | receive1 |
| receive1 | Dataready | | test |
| test | Mbusy | | test |
| test | (ΔMbusy)/\Pregnil | SetPregready | waitproc |
| test | (ΔMbusy)/\Pregwptr | Setrequest | waitproc |
| waitproc | ΔPregnil | | waitproc |
| waitproc | Pregnil | | receive2 |
| receive2 | Dataready | Datataken | receive2 |
| receive2 | ΔDataready | | acksend1 |
| acksend1 | ΔAckgone | Ackgo | acksend1 |
| acksend1 | Ackgone | | acksend2 |
| acksend2 | Ackgone | | acksend2 |
| acksend2 | ΔAckgone | | receive1 |

The way in which processes operate with input or output instructions will now be further described. The instructions are equally applicable to process to process communication on the same microcomputer or different microcomputers. In either case the process identifies a channel for use in the message transmission and that channel has an address either of a memory channel (such as 50 to 53) or a serial link provided by a process register (such as 61 or 63). In the above definitions of input and output as well as the procedures wait and run, line numbers have been added to each stage of the definition for ease of reference although the line numbers form no part of the definition. In both input and output instructions the first line indicates that a sequence of events is to occur the first of which is defined in line number 2. The address of the channel to be used in the communication is loaded into AREGTR 35 so that the expression memory [AREG] identifies the channel. The contents of that channel are loaded into the OREGTR 31 so that the value in the channel is tested by the microcomputer to determine the state of the channel. In both the input and output instructions line 3 indicates various alternatives that may follow depending on the result of testing the contents of the OREGTR. The contents of the OREGTR may indicate that the channel already holds a first special value NIL, or a second special value READY or a third special value representing the workspace pointer of a descheduled process which has already executed an instruction to effect data transmission using that channel. In the case of an output instruction, if a test of the channel finds the special value NIL, the processor then carries out the sequence indicated in lines 11, 12 and 13 of the output instruction. If the channel contains the second special value READY, then the processor carries out the sequence specified in the three lines 6, 7 and 8 of the output definition. If on the other hand the channel is found to hold the workspace pointer of a descheduled process, this represents the condition TRUE in line 14 so that the processor then executes the sequence of three lines set out as 16, 17 and 18 of the output definition. Similarly, on execution of an input instruction, if testing of the OREGTR indicates that the channel has the special value READY, the processor follows the sequence of lines 6 and 7 of the input definition. If the channel has the special value NIL then the processor executes the sequence of lines 10 and 11 of the input definition. If the channel has the workspace pointer of a descheduled process then the processor carries out the sequence defined in lines 14 to 16 of the input definition.

COMMUNICATION BETWEEN PROCESSES ON THE SAME MICROCOMPUTER

Figure 3:
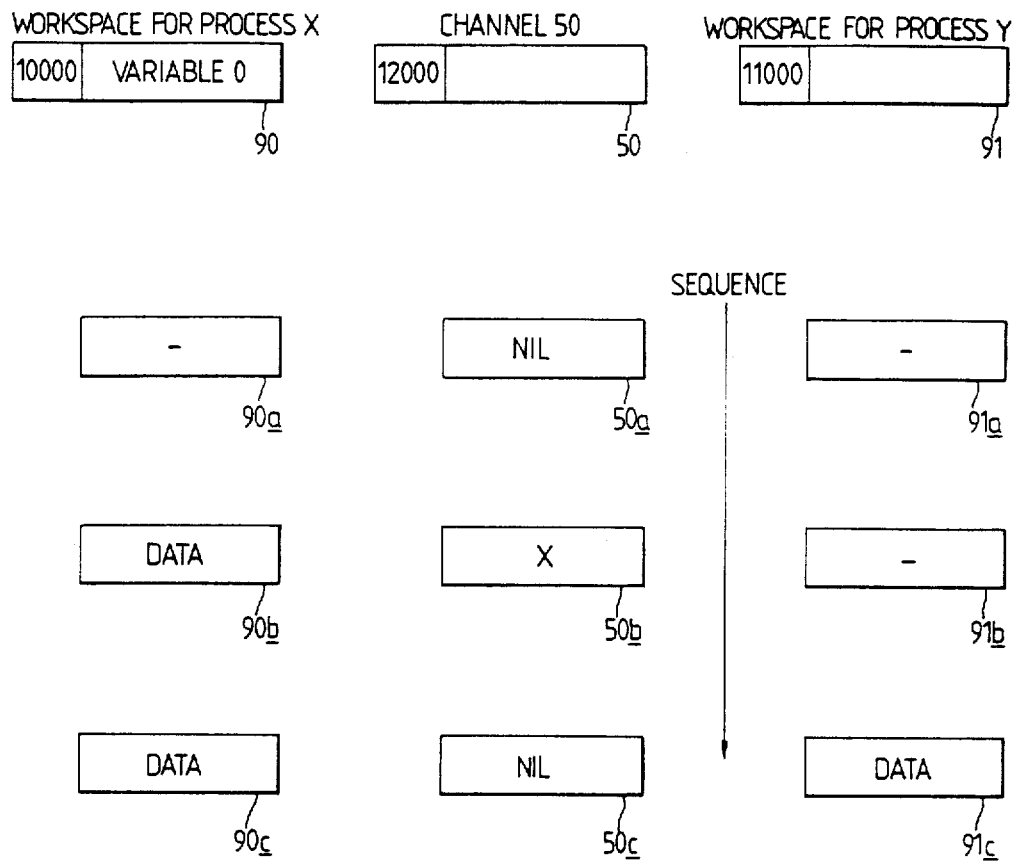
FIG. 3 illustrates a succession of states of two workspace locations and one memory channel during process to process communication on one microcomputer.

In this case, the channel to be used in the message communication will be a single memory location having a plurality of bit positions with a single address such as a single word location. As will be explained below, such a channel can only contain either the first special value NIL or the WPTR of a descheduled process. This will now be described for message transmission between a process X wishing to communicate via channel 50 with a process Y on the same microcomputer. Using the same memory location addresses as FIG. 2, process X has a workspace location 90 for a variable and process Y has a workspace location 91 for a variable. The channel 50 has the same address as indicated in FIG. 2. The channel 50 is a single word in memory providing a unidirectional communication channel which is shared by two and only two processes at any one time. If process X is to execute an output instruction, it first identifies the address of the channel 50 by loading the address of channel 50 into the AREGTR and the data to be transmitted is loaded into the BREGTR. On execution of the output instruction by process X, the contents of channel 50 are tested and in accordance with FIG. 3 found to represent the first special value NIL. FIG. 3 illustrates a sequence of stages each carrying the subscript a, b and c and the condition NIL is represented at 50a. As the channel does not have the workspace pointer of process Y waiting to receive the data, lines 11 to 13 of the output definition are followed so that process X causes the data to be transferred from the BREGTR into location 90 of its own workspace (as indicated at 90b) and its workspace pointer is loaded into the channel as indicated at 50b. Process X then executes a "wait" procedure which deschedules process X. Process X now waits until process Y is ready to input the data. When process Y approaches the corresponding stage of its program, it identifies the channel 50 by loading the address of channel 50 into the AREGTR and carries out an input instruction which on executing lines 2 and 3 of the input definition, locates the workspace pointer of process X in channel 50. This meets the condition TRUE in line 12 of the input definition so that process Y then carries out lines 14 to 16 of the input definition. This causes the data stored in the workspace location 90 of process X to be copied into location 91 of the workspace of process Y as indicated at 91c. It also loads the first special value NIL into channel 50 as indicated at 50c. It then causes a "run" procedure for process X which adds process X to the end of the list awaiting process operation. This is the position shown at the end of the sequence in FIG. 3 with process Y having continued without interruption and process X waiting on a list.

As can be seen from the definition of the procedure "wait" line 2 of the definition has the effect of storing an indication of the present program stage of the process at a workspace location having an offset of one from the workspace pointer for the process, as shown at 92 in FIG. 2. Lines 3 to 13 of the definition of "wait" refer to external communications. Line 14 of the definition of "wait" causes the WPTR REG 32 to be loaded with a pointer to the next process on the list awaiting execution (taken from location 93, which has an offset of 2 from the WPTR location as shown in FIG. 2) and line 15 loads the register 33 with the program stage indication of that process as soon as it becomes the current process. As can be seen from the definition of "run" line 2 sets out the possibility of two alternative situations. The first of these is the condition in line 2 in which the contents of the OREGTR are not READY in which case the sequence of lines 4 and 5 is followed or alternatively the OREGTR does have the value READY as indicated in line 6 in which case no action is taken. This occurs in external communications which are to be described below. The effect of line 4 of the definition of run is to add the process which is to be scheduled to the end of the list by having its workspace pointer stored in the workspace of the process currently indicated as the last on the list and this is done at an offset of two from the WPTR of the process as indicated at address 10998 in FIG. 2.

According to line 5 of the definition of run, the WPTR of the process being scheduled is entered into the LPTR REG 34 indicating that it is now the last on the list.

The second special value "READY" is only applicable in communication between processes on different microcomputers and will be described below.

COMMUNICATION BETWEEN PROCESSES ON DIFFERENT MICROCOMPUTERS

Figure 5:
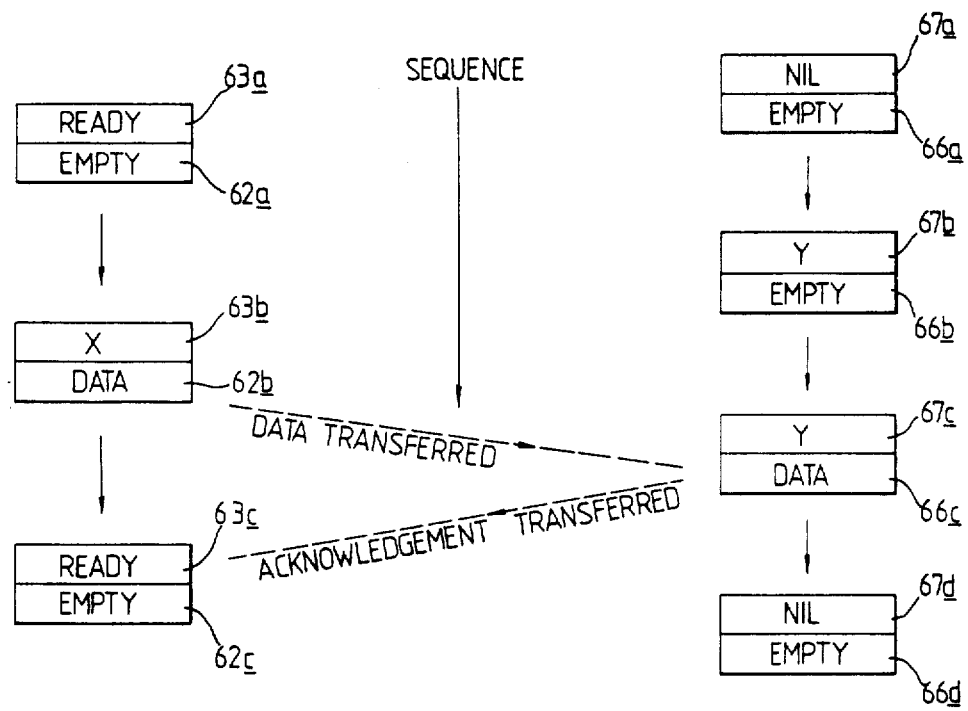
FIG. 5 shows a sequence of states for process and data registers in the microcomputers shown in FIG. 4 during process to process communication between the two microcomputers.

This will be described with reference to the sequence illustrated in FIG. 5 representing an outputting process X on microcomputer 11a transmitting a message via line 81 to an inputting process Y on microcomputer 11b. Successive stages of the registers are marked with subscripts a to d in FIG. 5. External communication is effected in generally similar manner using identical input and output operations although the control logical for the serial links may set the process registers to a second special value READY and they may also provide input or output requests on lines 94 and 95 to the CPU 12 of each microcomputer in order to schedule any descheduled process. As can be seen from the tables showing the outputs from the control state machines, each output process register is reset to READY whereas each input process register is normally reset to NIL. This is the condition shown for the register 63a and register 67a in FIG. 5. For the process X to output dta, it first loads the address of the channel, which in this case is the output process register 63, into the AREGTR and loads the data to be output into the BREGTR. On executing an output instruction the contents of the channel are loaded into the OREGTR and tested and as indicated at 63a in FIG. 5, this detects the second special value READY due to the reset condition caused by the output control state machine 71. The data register 62a is marked EMPTY indicating that the relevant data has not yet been loaded into the register. It will be understood that the word EMPTY marked on a data register means that the contents of the register have no significance. In accordance with the definition of the output instruction, lines 6, 7 and 8 of that definition cause the data to be transferred from the BREGTR into the output data register 62, as this has an address which is an offset of one from the process register 63, and stores the workspace pointer of process X in the channel 63b and executes a "wait" procedure which deschedules process X. This is the position shown at 63b and 62b in FIG. 5. The output control logic 70 due to changes in state of the state machines causes output of the data along line 81 to the input data register 66 of microcomputer 11b.

For the purposes of FIG. 5, it will be assumed that process Y has already executed an input instruction prior to receipt of data in the data register 66. At the time the process Y executed the input instruction, the process register 67 will have held the special value NIL as this was the reset condition caused by operation of the control state machine. Process Y will have tested the value in the channel and on finding NIL will have carried out lines 9 and 10 of the input definition. In other words, the workspace pointer of process Y will have been loaded into the process register 67 and process Y will have been descheduled by the wait procedure. This is the position shown at 67b and 66b in FIG. 5 and is assumed to be the position when data is received via line 81 into the input data register 66.

The input control logic 73 on microcomputer 11b then changes state on receipt of the data to generate an input request to the CPU 12 on line 94 of microcomputer 11b. In order to understand the effect of this, it is necessary to consider lines 3 to 7 of the definition of the procedure "wait". Whenever a process being executed by microcomputer 11b is descheduled by a wait procedure, the CPU of microcomputer 11b looks for any external input request from a serial link as required by line 3 of the definition of procedure "wait". If there are no input requests it moves to line 9 of the definition where it looks for any external output request. In the definition of "wait", link[process] indicates the contents of a process register of serial link, and link[data] indicates the contents of a data register of a serial link. The CPU services any input requests or output requests on lines 94 and 95 before executing the next process on the waiting list. In the present case, when the CPU 12 of microcomputer 11b next ceases executing a process, it will find an input request from channel 67 and this will cause the CPU to carry out lines 5 to 8 of the definition of the procedure "wait". This has the effect, due to lines 5 and 8, of rescheduling process Y, line 6 loads the value NIL into the process register as shown at 67b and line 7 causes the data from the input data register 66 to be transferred to the workspace of process Y. In addition, the input control logic 73 provides an output signal to the output control logic which causes the output channel 65 to transmit an acknowledge signal via line 84 to the microcomputer 11a.

The input control logic 73 on microcomputer 11a then provides an output to the output control logic 70 causing an output request to the CPU 12 on the microcomputer 11a. When the processor of microcomputer 11a next deschedules a current process, the processor looks for any input or output requests from the link logic as previously described and will find an output request from the logic associated with the output register 63 and will therefore follow the sequence defined in lines 11 to 13 of the definition of the procedure "wait". This causes the workspace pointer of process X to be loaded into the OREGTR, the special value READY is loaded into the process register 63 and process X is rescheduled. It will be seen that in this sequence the output process and data registers 63 and 62 go through the changes indicated by the subscripts a, b and c in FIG. 5 whereas the input process and data registers undergo the sequence illustrated by the subscripts a to d illustrated in FIG. 5.

If in the above example data had been transferred via line 81 to the input data register 66 of the microcomputer 11b before process Y carried out an input instruction, the input control logic of microcomputer 11b would, following the above table for the input control state machine, change the value of the input process register 67 to special value READY so that subsequent execution of the input instruction by process Y would locate the special value READY and process Y would carry out the sequence according to lines 6 and 7 of the definition of input. This would mean that data would be transferred from the input data register 66 to the workspace of process Y and the special value NIL would be loaded into the process register 67 and process Y would continue without interruption.

It will be appreciated that in the above examples, the microcomputer is arranged to effect communication between processes when both processes are at corresponding stages in their program sequences. If either process attempts to transmit data when the other is not at a corresponding stage, the process which initiates the transmission is held up until both processes are at corresponding stages. Each process involved in the communication requires only one input or output instruction in its program sequence so that neither process is descheduled more than once in order to effect the data transmission. Furthermore, for communications between processes on the same microcomputer, the memory space occupied by communication channels is reduced in requiring only one work of memory for each channel. The input and output instructions allow for addressing of workspace locations. This is advantageous in reducing the number of instructions or operations required to permit process to process communication and it permits more efficient transfer of data into process workspace locations.

I claim:

1. A microcomputer comprising memory and a processor coupled to read from and write into said memory, said processor for executing a plurality of concurrent processes having sequential instructions in respective programs, said instructions including a communication instruction of a first type to output data and a communication instruction of a second type to input data, said microcomputer comprising:
   (i) process scheduling means having:
      a. means for identifying one or more processes which form a collection awaiting execution by the processor,
      b. means, cooperating with said means for identifying, for descheduling a process by interrupting execution of the current process,
      c. means, cooperating with said means for identifying, for scheduling a process by adding it to said collection, and
   (ii). a synchronizing channel for enabling a synchronized communication between a pair of said processes each having a single communication instruction in its program to enable said synchronized communication between the pair of processes, said channel comprising means for holding either a first value indicating that one of said pair of processes has reached a communication instruction in its program requiring communication through said channel, or a different value indicating that neither process of said pair has reached a communication instruction in its program requiring communication through said channel, and
   (iii). control means responsive to execution of a communication instruction by one of said pair of processes to test the contents of said channel, said control means being responsive to location of said first value in said channel to continue executing instructions of the current process and responsive to location of a different value in said channel to deschedule the current process, whereby both processes in said pair are at corresponding program instructions when said communication occurs, and neither process of said pair is descheduled more than once to effect said synchronized communication.

2. A microcomputer according to claim 1 in which the scheduling means includes means for indicating the current process which is being executed by the processor, said microcomputer further including means for loading into said synchronizing channel an identification of the current process if that current process is descheduled as a result of said testing of the contents of the channel.

3. A microcomputer according to claim 2 in which said memory provides for each process a workspace having a plurality of addressable locations including locations for recording variables of said process, said microcomputer including a processor register arranged to hold a workspace pointer value identifying an address of the workspace of the current process.

4. A microcomputer according to claim 3 in which said identification to be loaded into said channel is said workspace pointer value.

5. A microcomputer according to claim 4 wherein said synchronizing channel is one of a plurality of channels, each comprising an addressable store location.

6. A microcomputer according to claim 5 wherein said synchronizing channel and control means are arranged to permit data transmission between processes which are executed on the same microcomputer, and wherein said synchronizing channel comprises a memory location.

7. A microcomputer according to claim 6 wherein said microcomputer comprises an integrated circuit device and said synchronizing channel comprises a memory location in memory on the same integrated circuit device as the processor.

8. A microcomputer according to claim 7 wherein said synchronizing channel consists of a single memory location having a bit size equal to that necessary for holding the address of another memory location.

9. A microcomputer according to claim 8 wherein said control means is arranged, on detection of the identification of a descheduled process in said channel, to operate said means to schedule the process identified by said identification.

10. A microcomputer according to claim 9 being arranged to store, in a first memory location assigned to the current process, data to be output by a current outputting process if that current process becomes descheduled as a result of the test on the contents of the said channel following execution of an output instruction.

11. A microcomputer according to claim 10 including means for transferring stored data from said first memory location assigned to the descheduled process to a second memory location assigned to a current inputting process in response to execution of an input instruction by an inputting process which locates in said channel an indication of the process corresponding to said first memory location.

12. A microcomputer according to claim 9 in which said microcomputer is arranged to store data output through a channel by a current process in a memory location corresponding to an inputting process if that inputting process has been descheduled as a result of the execution of an input instruction using the same channel.

13. A microcomputer according to claim 3 in which the identification to be loaded into said channel is said workspace pointer value, wherein said synchronizing channel and control means are arranged to permit data transmission between processes which are executed on the same microcomputer, said channel comprising a memory location, said microcomputer comprises an integrated circuit device, said channel comprising a memory location on the same integrated circuit device as the processor, wherein said store means forming a channel comprises a single memory location having a bit size equal to that necessary for holding the address of another memory location, and wherein each channel is arranged to hold a workspace pointer value for a descheduled process or a first special value indicating that no process has yet executed an input or output instruction using that channel, and means is provided to store output data in a memory location assigned to a descheduled output process using that channel, and to store, in a memory location assigned to an input process, input data after execution of an input instruction by an inputting process.

14. A microcomputer according to claim 5 wherein said synchronizing channel and said control means are arranged to permit external data transmission between processes which are executed on different microcomputers and said channel comprises a first register forming part of an external communication link.

15. A microcomputer according to claim 14 in which each external communication link has an output channel and an input channel each including a second register for holding data to be output or input through the link.

16. A microcomputer according to claim 15 in which each said register of a said communication link is addressable as a memory location.

17. A microcomputer according to claim 16 in which means is provided to load into said first register of a link for use by a inputting process, a first data to indicate that no process has yet executed an input instruction using that channel or an indication of a process that is descheduled after executing an input instruction using that channel.

18. A microcomputer according to claim 17 in which means is provided responsive to receipt of data in a second register of an input channel to load into said first register of the input channel a second data if no inputting process has executed an input instruction using that channel before receipt of data in said second register.

19. A microcomputer according to claim 16 in which means is provided to load into the first register of a link for use by an outputting process, a data to indicate that no process has yet executed an output instruction using that channel or an indication of a process that is descheduled after executing an output instruction using that channel.

20. A microcomputer according to claim 19 in which said synchronizing channel and control means respond to detection of said data in a first register of a link by descheduling a current process if executing an output instruction, and loading data to be transmitted into the second register of the link.

21. A microcomputer according to claim 18 in which said synchronizing channel and control means are responsive to detection of said first data in a said first register of a link by descheduling a special value in a said first register of a link by descheduling a current process if executing an input instruction and loading into said first register an indication of that process.

22. A microcomputer according to claim 21 in which said synchronizing channel and control means respond to detection by an inputting process of said second data in a said first register of a link by transferring data from the second register of the link to a memory location for the inputting process and permitting the processor to continue execution of the program sequence of the inputting process.

23. A microcomputer according to claim 22 including means to transfer data from a said second register of a link to a memory location for an inputting process on a first microcomputer and means for generating an acknowledgment signal for transmission to an outputting process on a second interconnected microcomputer.

24. A microcomputer according to claim 23 in which each link includes control means responsive to receipt of data or an acknowledgment signal by a second register of an input channel of a link for generating a request signal to the processor of the microcomputer providing the link, to schedule any process which according to the contents of the first register of that link is descheduled.

25. A microcomputer according to claim 24 in which said link control means comprise programmed logic array devices having a programmed succession of output signals.

26. A microcomputer according to claim 8 wherein each channel comprises a single addressable word location in memory arranged to hold a data indicating that no process has yet executed an input or output instruction using that channel or a pointer indicating the workspace address of a process which is descheduled after executing an input or output instruction using that channel.

27. A microcomputer according to claim 26 including means for transferring data from an address in the workspace of an outputting process to an address in the workspace of an inputting process without descheduling the current process if the current process on executing an input or output instruction locates a pointer to the workspace of a descheduled process in said channel.

28. A network of microcomputers comprising a plurality of microcomputers as claimed in claim 27 interconnected to permit data transmission on execution of input and output instructions.

29. A method of operating concurrent processes in a computer system having at least one processor and memory wherein each of said concurrent processes executes a plurality of instructions included in respective programs, said instructions including a communication instruction of a first type of output data and a communication instruction of a second type to input data, the method comprising the steps of:
 (i) scheduling a plurality of said processes for execution by a processor, including
  a. identifying one or more processes which form a collection awaiting execution by a processor, b. executing one of said processes, said process being a current process, including executing instructions from its corresponding program, c. descheduling a process by interrupting execution of instructions by the process, and d. scheduling a process by adding it to said collection, and (ii) enabling synchronized communication between a communicating pair of said processes which each include a communication instruction in its program, said communication including:

a. identifying a channel for use in synchronizing communication between said pair of processes, b. storing in said channel a value indicating whether either of said pair of communicating processes has reached a communication instruction in its program requiring communication through said channel, c. in response to execution of a communication instruction by one of said pair of communicating processes, testing the value held in the said channel, and d. descheduling said one of the communicating processes if the channel does not contain a value indicating that the other of the pair of communicating processes had already reached a communication instruction requiring communication by said channel, whereby both processes in said pair are at corresponding program instructions where said communication is effected, said pair of communicating processes each having a single communication instruction in its program sequence to effect said communication whereby neither process of said pair is descheduled more than once to effect said synchronized communication.

30. The method according to claim 29 including continuing the execution of instructions of said current process if, after testing the value held in said channel, the channel contains a value indicating that the other of the pair of communicating processes has already reached a communication instruction requiring communication through said channel.

31. The method according to claim 30 wherein said concurrent processes are operated on the same microcomputer and said channel is located by addressing a memory location.

32. The method according to claim 30 wherein said channel comprises a single memory location and said step of storing in the channel a value indicating that one of said pair of communicating processes has reached a communication instruction in its program comprises writing into the memory location the address of a further memory location.

33. The method according to claim 32 further comprising establishing within the memory a respective workspace for each process, each workspace comprising a plurality of addressable memory locations, and recording in said locations of each workspace variables associated with the corresponding process, defining a workspace pointer for each process identifying an address of the workspace for each process and using a workspace pointer as said address of a further memory location for writing into said channel.

34. The method according to claim 30 wherein said pair of communicating processes are executed on different microcomputers and said channel is provided by two registers, said synchronized communication comprising loading into one register said value indicating whether either of the pair of communicating processes has reached a communication instruction in its program and loading into the other of the registers data to be communicated in the communication.

35. A method of enabling the transmission of first data between two processes executed on a microcomputer wherein an addressable memory location is used as a channel to enable said two processes to be at corresponding stages in their program sequences when the transmission of said first data occurs, said method comprising: (i) executing a current process in accordance with a sequence of program steps; (ii) indicating which process or processes await execution; (iii) providing an output instruction by said current process indicating that it is ready to transmit said first data; and (iv) responding to the output instruction by (a) identifying the address of the channel to be used for said transmission, (b) testing the contents of said channel to detect either a first pointer which identifies a descheduled process awaiting an input through said channel or second data indicating that no process is awaiting use of the channel, (c) in response to detecting said second data in said channel, storing said first data in a region of memory corresponding to the current process, loading into the channel a second pointer identifying the current process, and descheduling the current process, and (d) in response to detecting said first pointer in said channel, transferring said first data to a region of memory corresponding to said descheduled process, loading said second data into said channel, and causing said descheduled process to be rescheduled for execution.

36. A method of enabling data transmission according to claim 35 wherein another current process ready to receive said first data provides an input instruction, the microcomputer in response to the input instruction: (a) identifying the address of the channel to be used for said transmission, (b) testing the contents of said channel to detect either said second pointer or said second data, (c) in response to detecting said second data, loading said first pointer into the channel and descheduling said another current process, and (d) in response to detecting said second pointer, transferring said first data from said region of memory to a second region of memory corresponding to said another current process, loading said second data into the channel and causing the process identified by said second pointer to be rescheduled for execution.

* * * * *